(12) United States Patent
Scott et al.

(10) Patent No.: US 10,108,804 B2
(45) Date of Patent: *Oct. 23, 2018

(54) ELECTRONIC PERMISSION SLIPS FOR CONTROLLING ACCESS TO MULTIMEDIA CONTENT

(71) Applicant: AT&T Intellectual Property I, L.P., Atlanta, GA (US)

(72) Inventors: Charles Varnon Scott, Austin, TX (US); James Leonard Cansler, Cedar Park, TX (US); Ankur Mukerji, Auburn, CA (US); Scott Anthony White, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/691,592

(22) Filed: Nov. 30, 2012

(65) Prior Publication Data
US 2013/0091586 A1   Apr. 11, 2013

Related U.S. Application Data

(63) Continuation of application No. 12/037,787, filed on Feb. 26, 2008, now Pat. No. 8,356,337.

(51) Int. Cl.
*G06F 7/04* (2006.01)
*H04L 9/32* (2006.01)
*G06F 21/60* (2013.01)

(52) U.S. Cl.
CPC ............ *G06F 21/60* (2013.01); *G06F 21/604* (2013.01); *G06F 2221/2149* (2013.01)

(58) Field of Classification Search
CPC .................... G06F 21/604; G06Q 2230/00
USPC ............................................. 713/168; 726/4
See application file for complete search history.

(56) References Cited

U.S. PATENT DOCUMENTS

| | | | |
|---|---|---|---|
| 6,493,744 B1 * | 12/2002 | Emens | H04L 67/2819 |
| | | | 386/262 |
| 6,732,179 B1 | 5/2004 | Brown et al. | |
| 6,898,631 B1 * | 5/2005 | Kraft | H04L 12/1831 |
| | | | 379/1.03 |
| 7,046,139 B2 | 5/2006 | Kuhn et al. | |
| 7,246,201 B2 | 7/2007 | Wu | |
| 7,340,518 B1 * | 3/2008 | Jenkins | H04L 29/12216 |
| | | | 709/206 |
| 7,587,482 B2 * | 9/2009 | Henderson et al. | 709/223 |
| 2002/0124252 A1 * | 9/2002 | Schaefer et al. | 725/33 |

(Continued)

*Primary Examiner* — Morshed Mehedi
*Assistant Examiner* — Abdullah Almamun
(74) *Attorney, Agent, or Firm* — Jackson Walker L.L.P.

(57) ABSTRACT

An administrator controls viewer access to restricted multimedia programs using electronic permission slips. In response to a viewer's request to view a restricted multimedia program, the viewer may initiate the generation of an electronic permission slip that is sent to an electronic device associated with the administrator. The electronic permission slip may include text-based information, graphical information, audio information, and the like. The electronic permission slip may enable input of permission data regarding whether the viewer is allowed to receive the blocked program. In response to the administrator granting permission, a service provider network allows the viewer to access the restricted multimedia program.

18 Claims, 5 Drawing Sheets

(56) References Cited

U.S. PATENT DOCUMENTS

| | | | |
|---|---|---|---|
| 2004/0010798 A1* | 1/2004 | Galli | H04H 60/31 |
| | | | 725/28 |
| 2005/0040944 A1 | 2/2005 | Contestabile | |
| 2005/0251827 A1 | 11/2005 | Ellis et al. | |
| 2006/0148454 A1* | 7/2006 | Welch | G06Q 20/32 |
| | | | 455/414.1 |
| 2007/0011705 A1* | 1/2007 | Tsuria | B64D 11/0015 |
| | | | 725/46 |
| 2007/0028258 A1* | 2/2007 | Wollmershauser | G06Q 30/06 |
| | | | 725/29 |
| 2007/0055517 A1 | 3/2007 | Spector | |
| 2007/0116195 A1* | 5/2007 | Thompson et al. | 379/67.1 |
| 2007/0180100 A1 | 8/2007 | Biggs et al. | |
| 2008/0016545 A1* | 1/2008 | DeCinque | G06F 17/30017 |
| | | | 725/138 |
| 2008/0118080 A1 | 5/2008 | Gratke et al. | |
| 2008/0148310 A1 | 6/2008 | Strickland | |
| 2008/0228481 A1 | 9/2008 | Mozer | |
| 2009/0134991 A1 | 5/2009 | Shuart | |
| 2009/0327079 A1* | 12/2009 | Parker et al. | 705/14.55 |
| 2013/0159836 A1* | 6/2013 | Ferraro | G06Q 10/00 |
| | | | 715/234 |
| 2014/0122883 A1* | 5/2014 | LeVasseur | H04L 63/306 |
| | | | 713/170 |

\* cited by examiner

ELECTRONIC PERMISSION SLIPS FOR CONTROLLING ACCESS TO MULTIMEDIA CONTENT

The present patent application is a continuation of U.S. patent application Ser. No. 12/037787, filed Feb. 26, 2008, the entirety of which is hereby incorporated by reference.

BACKGROUND

Field of the Disclosure

The present disclosure generally relates to distributing digital television content and more particularly to controlling access to television content using electronic permission slips.

Description of the Related Art

Multimedia content may be received through distribution systems that permit administrators (e.g., parents) to pre-configure automatic settings that prevent other users (e.g., children) from receiving and viewing objectionable programs. For example, a parent may configure a set-top box to automatically restrict a child from receiving television programs that have a high rating for violence.

DESCRIPTION OF THE EMBODIMENT(S)

Figure 1:
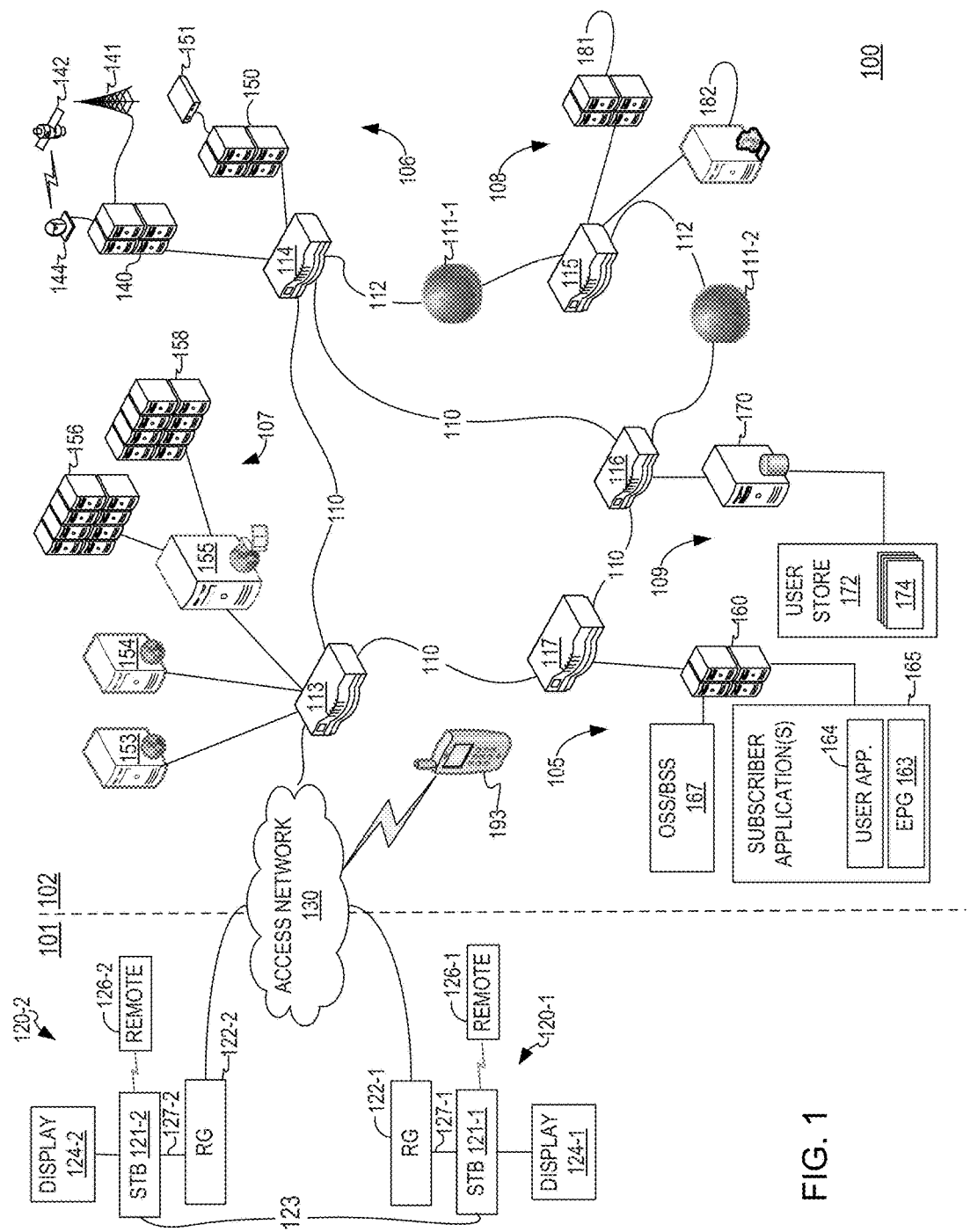
FIG. 1 depicts an example provider network for enabling an administrator to control access to restricted multimedia programs in accordance with disclosed embodiments.

In one aspect, an embodied method allows an administrator to control access to restricted multimedia programs. The method includes receiving a request for permission to view the restricted multimedia program and presenting an indication of the request to an administrator. The method further includes receiving an indication of whether the administrator grants permission. In addition, the method includes granting access the multimedia program if the administrator grants permission. In some embodiments, presenting the indication of the request includes providing a short message service (SMS) compatible message. In other embodiments, presenting the indication of the request includes providing an audio message on a telephone device. The audio message contains synthesized speech in some embodiments. In some embodiments, receiving an indication of whether the administrator grants permission includes receiving tone inputs generated by a telephone device. Presenting to the administrator the indication of the request may include presenting graphical-based voting buttons to the administrator on a display.

In another aspect, an embodied service is disclosed in which an administrator controls access to restricted multimedia programs. The service includes receiving a user request to view a multimedia program and sending information indicative of the multimedia program to a remote device. Further, the service includes prompting an administrator to indicate whether an authorization to view the multimedia program is granted by the administrator. In response to the administrator indicating the authorization is granted, the service includes providing the multimedia program for viewing, recording, or listening by the user. In some embodiments, the service includes denying the user access to the multimedia program in response to the administrator indicating the authorization is not granted. The service may also include, in some embodiments, providing the user an indication that the authorization is not granted by the administrator. Prompting the administrator to indicate whether authorization is granted may include prompting an SMS text message to be sent to a device associated with the administrator. In contrast, prompting the administrator may include sending an email to an account associated with the administrator. Information indicative of the multimedia program may be provided to the administrator using synthesized speech, text, photograph images, or graphical symbols, as examples.

In still another aspect, an embodied system processes electronic permission slips to allow an administrator to selectively control access to restricted multimedia programs. The system comprises a permission slip generator for preparing a permission slip for the administrator. The permission slip includes an identifier of a restricted multimedia program that a user has requested. The administrator provides permission data indicative whether the user is allowed to view the restricted multimedia program. The system further includes a permission slip receiver for processing the permission data and allowing the user to view the restricted multimedia program in response to permission data indicative of the administrator's allowance. The permission slip receiver is further for preventing the user from viewing the restricted multimedia program in response to permission data indicative of the administrator's denying permission. The permission slip may be sent to the administrator in email format or in SMS message format, as examples. Similarly, the permission data from the administrator may include text-based messages or may be derived from tonal input or voice input provided by a telephonic device associated with the administrator. The permission data may include audio output from the administrator and the system may further include a voice recognition module for converting the audio output into textual data. Additionally, the system may include a comparison module for comparing the textual data to words known to indicate granting or denying permission.

The following description includes examples and details to enable one of ordinary skill in the art to practice the claimed subject matter without undue experimentation. It should be apparent to a person of ordinary skill that disclosed embodiments are included as examples and not exhaustive of all possible embodiments. Regarding reference numerals used to describe some elements in the figures, a hyphenated form of a reference numeral refers to a specific instance of an element and the un-hyphenated form of the reference numeral refers to the element generically or collectively. Thus, for example, "set-top box 121-1" refers to an instance of a set-top box. Accordingly, multiple set-top boxes may be referred to collectively as "set-top boxes 121" or "STBs 121." In addition, using this numbering convention, a single set-top box may be referred to more generically as "set-top box 121" or "STB 121."

Disclosed embodiments relate to controlling access to multimedia programs that may include television programs, video-on-demand ("VOD") programs, radio programs, and a variety of other multimedia content forms. Suitable types of networks that may be provisioned for distribution and delivery of such multimedia content include, as examples, telephony-based networks, coaxial-based networks, satellite-based networks, and the like. In some networks that may include, for example, traditional coaxial-based "cable" networks, a service provider distributes a mixed signal that may include a relatively large number of multimedia content channels. Each channel may be transmitted at a different frequency band (i.e., channel), through a coaxial cable, a fiber-optic cable, or a combination of these and potentially other cables or wireless media. The enormous bandwidth required to transport simultaneously large numbers of multimedia channels is a source of constant challenge for cable-based providers. In these types of networks, a tuner or some form of receiver is required to select a channel from the mixed signal for playing or recording. Accordingly, a user wishing to play or record multiple channels simultaneously may need distinct tuners for each desired channel. This is an inherent limitation of cable networks and other mixed signal networks.

In contrast to mixed signal networks, IPTV networks generally distribute content to a user only in response to user requests. Therefore, at any given time, the number of content channels provided to the user is relatively small. For example, a user may simultaneously receive one or more multimedia streams that contain one channel for viewing and possibly one or more channels for recording during viewing of the first channel. As suggested by the name, IPTV networks typically employ IP and other open, mature, and pervasive networking technologies. During transmission, rather than requiring the use of a particular frequency band, an IPTV television program, movie, or other form of multimedia content is a digital, packet-based stream that corresponds to a particular network address (e.g., an IP address). In such networks, the concept of a channel is inherently distinct from the frequency channels native to mixed signal networks. Moreover, whereas a mixed signal network may require a hardware-intensive tuner for every channel to be played, IPTV channels can be "tuned" simply by transmitting a request (e.g., a universal resource locator (URL) request) to a server.

To transmit multimedia content, IPTV service providers may utilize existing infrastructure such as existing telephone lines. In addition, within a user's site (e.g., home or office), an IPTV service provider may utilize customer premise equipment (CPE) a residential gateway (RG), digital subscriber line (DSL) modem, or other equipment that be enabled for receiving multimedia content and data from the provider network. Such CPE may include set-top boxes (STBs), displays, and other appropriate equipment for converting the received multimedia content into usable form. In some implementations, a core portion of an IPTV network is implemented with fiber optic cables while the so-called "last mile" may include conventional, unshielded, twisted-pair, copper cables (e.g., traditional telephone lines).

Typical IPTV networks support bidirectional (i.e., two-way) communication between a user's CPE and the content provider's equipment. Bidirectional communication allows the content provider (i.e., "service provider") to deploy advanced features, such as video-on-demand (VOD), pay-per-view, electronic programming guides ("EPGs"), and the like. Bidirectional networks may also enable a service provider to collect information related to a user's preferences, viewing habits and the like. In accordance with disclosed embodiments, bidirectional communication permits a user to request permission to view a restricted multimedia program from an administrator that communicates using a remote device such as a remote personal computer, a personal digital assistant (PDA), or mobile telephone. The bidirectional nature of the IPTV network also allows software applications related to the control of multimedia access to be network-based. In addition, communication between STBs over the provider network is permitted due to the bidirectional nature of an IPTV provider network. In this way, for example, a child in one room can request permission from a parent that may be viewing television in a different room.

Additional details of embodied systems and methods are included in the attached drawings. FIG. 1 depicts selected aspects of a multimedia content distribution network (MCDN) 100. MCDN 100 is a provider network that, as shown, may be divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a user's home or business to a local exchange. In these embodiments, the physical layer of access network 130 may include twisted pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to users may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

In other embodiments, access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100 private network 110 includes a hierarchy of VHOs.

A national VHO may deliver national content feeds to several regional VHOs. In turn, each regional VHO may include its own acquisition resources to acquire local content, such as from the local affiliate of a national network, and to inject the local content into the feeds. The regional VHOs may then deliver the local and national content for reception by users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

As shown in FIG. 1, segments of private network 110 are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls (not depicted) that maintain the security and privacy of network 110. Other portions of MCDN 100 communicate over a public network 112, including, for example, the Internet or other type of web network where the public network 112 is signified in FIG. 1 by the World Wide Web icons 111.

As shown in FIG. 1, the client side 101 of MCDN 100 depicts two of a potentially large number of client-side resources referred to herein simply as client(s) 120. Each client 120, as shown, includes an STB 121, an RG 122, a display 124, and a remote control device 126. Clients 120 may be in different user sites, for examples houses that are in different cities.

As shown in FIG. 1, RGs 122 may include elements of broadband modems (e.g., DSL modems), as well as elements of Ethernet-compliant routers and/or access points that are suitable for communication over LANs 127. In some embodiments, STBs 121 may be uniquely addressable Ethernet compliant devices. In the embodiment depicted in FIG. 1, remote control device 126 communicates wirelessly with STB 121 using an infrared (IR) or RF signal. Display 124 may include any form of conventional frequency tuner and may contain all or part of the functionality and circuitry of RG 122 and STB 121.

In IPTV-compliant implementations of MCDN 100, clients 120 are operable to receive packet-based multimedia streams from access network 130 and process the streams for presentation on displays 124. In addition, clients 120 are network-aware systems that may facilitate bidirectional-networked communications with server side 102 resources to facilitate network-hosted services and features such as the processing of electronic permission slips. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol Internet protocol (UDP/IP) and web protocols such as hypertext transport protocol (HTTP) over transport control protocol IP (TCP/IP). The depiction in FIG. 1 of server side 102 emphasizes network capabilities including application resources 105, content acquisition resources 106, content delivery resources 107, and OSS/BSS resources 108. One or more of these resources may have access to database resources 109.

Before distributing multimedia content to viewers, MCDN 100 first obtains multimedia content from content providers. To that end, acquisition resources 106 encompass various systems and devices to acquire multimedia content, reformat it when necessary or desired, and process it for delivery to users over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down-linked signals transmitted by a satellite 142 and received by parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 transmits acquired content over private network 110, for example, to one or more servers in content delivery resources 107. Prior to transmission, live acquisition server 140 may encode acquired content using, for example, MPEG-2, H.263, a Windows Media Video (WMV) family codec, or another suitable video codec. Acquired content may be encoded and compressed to preserve network bandwidth and network storage resources and, optionally, to provide encryption for securing the content. VOD content acquired by VOD acquisition server 150 may be in a compressed format prior to acquisition and further compression or formatting prior to transmission may be unnecessary.

Content delivery resources 107 as shown in FIG. 1 are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server may be referred to as time-shifted content to emphasize the ability to obtain and view VOD content substantially without regard to the time of day or the day of week.

Content delivery server 155, in conjunction with live content server 156 and VOD delivery server 158, responds to viewer requests for content by providing the requested content to the viewer. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver (e.g., STB 121 of client 120), where the content is parsed from individual packets and re-assembled into multimedia content suitable for processing by a STB decoder.

Viewer requests received by content delivery server 155 may include an indication of the content that is being requested. In some embodiments, this indication includes an IP address associated with the desired content. For example, a particular local broadcast television station may be associated with a particular channel and the feed for that channel may be associated with a particular IP address. When a user wishes to view the station, the user may interact with remote control device 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request for content by making a streaming video signal accessible STB 121 for conversion into usable form by display 124. Content delivery server 155 may employ unicast and broadcast techniques when making content available to a viewer. In the case of multicast, content delivery server 155 employs a multicast protocol to deliver a single originating stream to multiple clients. When a new user requests the content associated with a multicast stream, there may be latency associated with updating the multicast information to reflect the new viewer as a part of the multicast group. To avoid exposing this undesirable latency to the user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101 and server side 102. Client-facing switch 113, as shown, is so-named because it connects directly to the client 120 via access network 130 and it provides the network connectivity of IPTV services to users' locations.

To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including real-time transport protocol (RTP), real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent, in which the transport stream consists of a series of 188-byte transport packets. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide user access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies user information by communicating with user store 172 via the private network 110. Client gateway 153 may verify billing information and user status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming user and/or billing information, client gateway 153 may allow STB 121 access to IPTV content, VOD content, and other services. If client gateway 153 cannot verify user information for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system users. For example, subscriber applications 165 as shown include an electronic programming guide (EPG) application 163. Subscriber applications 165 may include other applications including user applications 164. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

As shown in FIG. 1, application server 160 hosts a generic application referenced as user application 164. User application 164 represents any application that may deliver a value-added feature to a subscriber or non-subscribing user. User application 164 is illustrated in FIG. 1 to emphasize the ability to extend the network's capabilities by implementing one or more networked-hosted applications. Because the application resides on the network, it generally does not impose any significant computing requirements on local devices or imply any substantial modifications to the client 120 including the STB 121. In some instances, an STB 121 may require knowledge of a network address associated with user application 164, but STB 121 and the other components of client 120 are largely unaffected. Accordingly, STBs that are not locally networked together may exchange information through user application 164 or may share information that is processed by one or more applications such as user application 164.

In accordance with disclosed embodiments, user application 164 may include software modules for generating and processing permission slips associated with a viewer seeking permission from an administrator to view restricted multimedia programs. Alternatively, parts of the software modules for generating and processing permission slips may reside on devices such as mobile telephone 193 and STBs 121. Accordingly, MCDN 100 may provide a service for controlling access to multimedia programs. In some embodiments, the service includes receiving a user request to view a restricted multimedia program. For example, a user of client 120-2 may provide user input to remote control device 126-2 to receive a restricted multimedia program such as a television program rated as unacceptable to young viewers. In response to the request to view the restricted content, the embodied service may include sending information indicative of the multimedia program to a remote device such as mobile telephone 193, which may be associated with an administrator that may grant permission for the user to view the restricted content. Accordingly, on mobile telephone 193 or using some other device or medium, the administrator is prompted to indicate whether an authorization to view the multimedia program is granted by the administrator. In response to the administrator indicating the authorization is granted, the service provides the multimedia program for consumption by the user. In contrast, in response to the administrator indicating the authorization is not granted, the service denies the user access to the multimedia program. In some embodiments, the embodied service may provide the user an indication that the authorization is not granted by the administrator. For example, the user may be given an audible indication, a visual indication, or both from display 124-2.

Additional elements shown in FIG. 1 include database switch 116, which is connected to applications switch 117 and provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including subscriber application 165. MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

Examples described herein are included as illustrative and not restrictive of claimed subject matter. For example, prompting the administrator to indicate whether an authorization to view the multimedia program is granted may be done in part using a voice note sent by email, an email, an SMS compliant text message, or other similar means of communication. In addition, synthesized speech may be presented to the administrator or user regarding the user request and the grant or denial of permission. An embodied service for controlling access to restricted multimedia programs may also include local-based or network-based voice recognition modules for processing spoken words and comparing them to known words to determine whether permission is granted.

Accordingly, MCDN 100 and associated components may include parental control features in accordance with disclosed embodiments. Such parental controls features may prevent, for example, a child from watching restricted multimedia programs such as violent television shows. In response to a user request to view a multimedia program, an administrator is provided the opportunity to provide or "fill in" an electronic permission slip to permit the requesting user to view the multimedia program. In some cases, an administrator receives a "blank" permission slip that presents the administrator the opportunity to grant or deny permission. In an example scenario, an electronic permission slip is initiated by a child during the initial stage of a proposed viewing experience and is responded to by the child's parent from one of a multitude of the parent's electronic devices such as mobile telephones, mobile e-mail devices, SMS text devices, personal computers, and the like. Such systems may allow a parent to exert needed or desired control over a child's television viewing activities.

In some disclosed embodiments, if an automated parental control system imposes a viewing restriction upon a child, the system may offer an option to request permission from a parent or other administrator. In response to the permission request, the system may send a real-time electronic communication (e.g., an email) to the devices of all persons with administrative privileges. In some embodiments, presence information is detected and used to determine which device or devices should receive the permission slip request. For example, a system may collect presence information regarding whether an administrator is logged into an Internet service provider.

Figure 2:
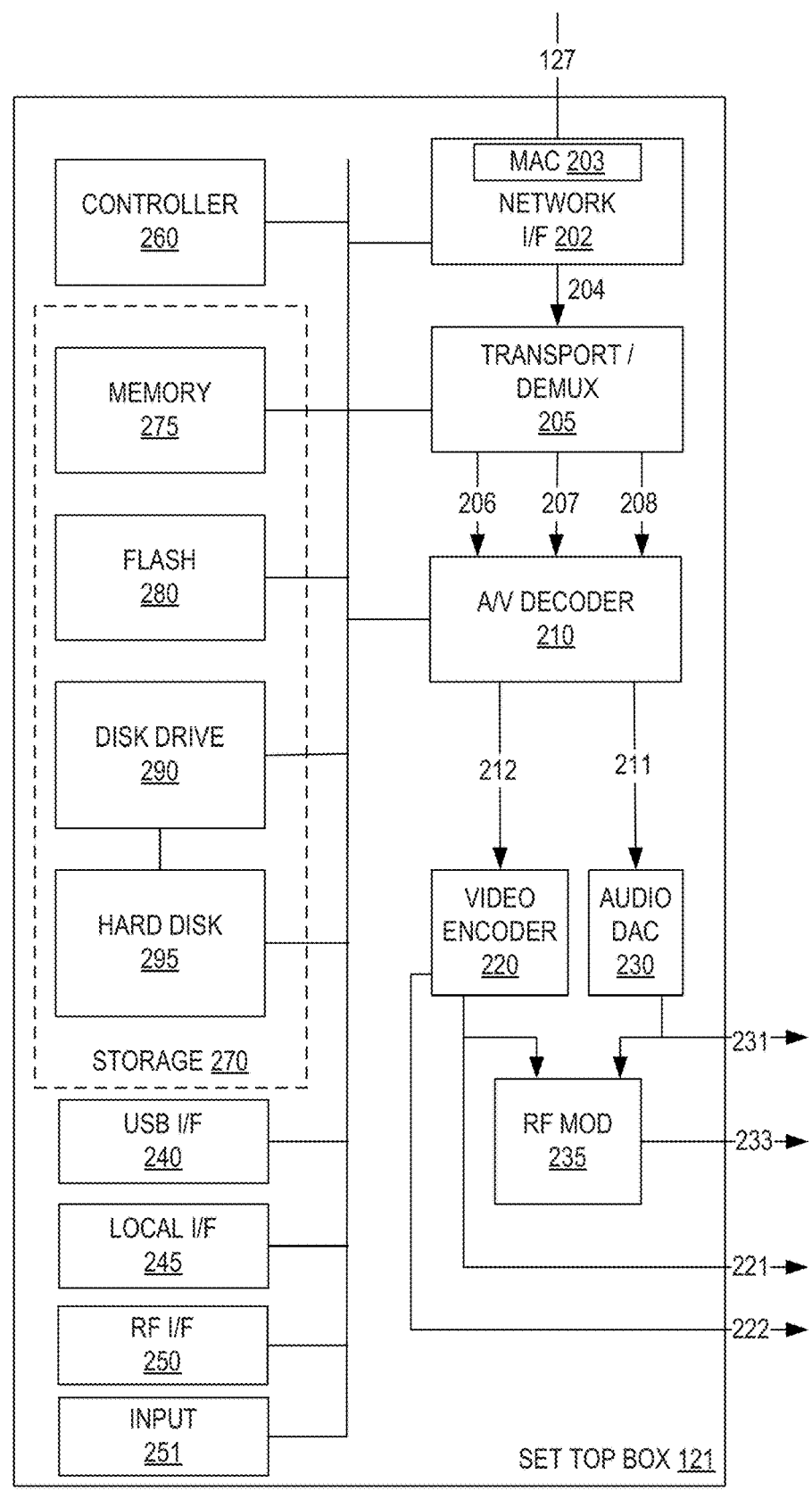
FIG. 2 depicts, in block diagram form, selected elements of an embodied set-top box.

FIG. 2 depicts selected components of STB 121, which may be similar to or identical to STB 121 in FIG. 1. As shown, STB 121 (FIG. 2) is enabled to control access to restricted multimedia programs based on administrator input which may be provided in real time or near real time. As shown, STB 121 is suitable for use in an IPTV client and includes functionality in some combination of hardware, software, and firmware to receive streaming multimedia data from an IP-based network and process the data to produce video and audio signals suitable for delivery to an NTSC, PAL, or other type of display 124. In addition, some embodiments of STB 121 may include resources to store multimedia content locally and resources to play back locally stored multimedia content.

As shown in FIG. 2, STB 121 includes a general-purpose processing core represented as controller 260. Controller 260 communicates with special purpose multimedia modules including, as examples, transport/demultiplexer module 205, an A/V decoder 210, a video encoder 220, an audio digital-to-analog converter (DAC) 230, and an RF modulator 235. Although FIG. 2 depicts each of these modules discretely, STB 121 may be implemented with a system on chip (SoC) device that integrates controller 260 and each of these multimedia modules. In still other embodiments, STB 121 may include an embedded processor serving as controller 260 and at least some of the multimedia modules may be implemented with a general-purpose digital signal processor (DSP) and supporting software.

As shown in FIG. 2, input module 251 may operate to receive permission data from an administrator over an access network, the Internet, a local area network, or a biometric data sensor, as examples, in accordance with disclosed embodiments. Input module 251, in some embodiments, may also receive, process, and relay audio signals that are indicative of a viewer's speech that may be included in a "blank" permission slip generated for presentation to an administrator. In addition, STB 121 may be enabled for performing speech recognition on the comments of a viewer for inclusion with such "blank" permission slips.

As shown, STB 121 includes a network interface 202 that enables STB 121 to communicate with an external network such as LAN 127. Network interface 202 may share many characteristics with conventional network interface cards (NICs) used in personal computer platforms. For embodiments in which LAN 127 is an Ethernet LAN, for example, network interface 202 implements level 1 (physical) and level 2 (data link) layers of a standard communication protocol stack by enabling access to the twisted pair or other form of physical network medium and by supporting low level addressing using media access control (MAC) addressing. In these embodiments, every network interface 202 includes, for example, a globally unique 48-bit MAC address 203 stored in a read-only memory (ROM) or other persistent storage element of network interface 202. Similarly, at the other end of the LAN connection 127, RG 122 (FIG. 1) has a network interface (not depicted) with its own globally-unique MAC address.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport/demux 205.

As shown in FIG. 2, STB 121 carries and processes digital multimedia stream 204, which in accordance with disclosed embodiments contains a multimedia program and may contain graphical elements for constructing graphics-based or audio-based permission slips. The digital multimedia stream 204 is a sequence of digital information that includes interlaced audio data streams and video data streams. The video and audio data contained in digital multimedia stream 204 may be referred to as "in-band" data in reference to a particular frequency bandwidth that such data might have been transmitted in an RF transmission environment. Digital multimedia stream 204 may also include "out-of-band" data that might encompass any type of data that is not audio or video data, but may refer in particular to data that is useful to the provider of an IPTV service (e.g., permission slip data). This out-of-band data might include, for example, billing data, decryption data, and data enabling the IPTV service provider to manage IPTV client 120 remotely. In some embodiments, some combination of a "blank" permission slip or returned permission slip may be transmitted as out-of-band data and otherwise excluded from the core audio or video portions of digital multimedia stream 204.

Transport/demux 205, as shown, is operable to segregate and possibly decrypt the audio, video, and out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 121 including RF interface 250 suitable for use with an RF remote control device (not shown) and a front panel interface (not shown). RF interface 250 may also be compatible to receive infrared signals, light signals, laser signals, or other signals from remote control devices that use signal types that differ from RF signals. RF interface 250 represents a hardware interface that may be enabled for receiving signals indicative of user inputs. For example, a user may provide user inputs to a remote control device for selecting or highlighting EPG elements on a display or setting preferences regarding permission slips that may be presented to administrators.

A/V decoder 210 processes digital audio, video, and out-of-band streams 206, 207, and 208 respectively to produce a native format digital audio stream 211 and a native format digital video stream 212. A/V decoder 210 processing may include decompression of digital audio stream 206 and/or digital video stream 207, which are generally delivered to STB 121 as compressed data streams. In some embodiments, digital audio stream 206 and digital video stream 207 are MPEG compliant streams and, in these embodiments, A/V decoder 210 is an MPEG decoder.

The digital out-of-band stream 208 may include information about or associated with content provided through the audio and video streams. This information may include, for example, the title of a show, start and end times for the show, type or genre of the show, broadcast channel number associated with the show, and so forth. A/V decoder 210 may decode such out-of-band information. MPEG embodiments of A/V decoder 210 support a graphics plane as well as a video plane and at least some of the out-of-band information may be incorporated by A/V decoder 210 into its graphics plane and presented to display 124, perhaps in response to a signal from a remote control device. In addition to potentially including data for presenting permission slips in accordance with disclosed embodiments, the digital out-of-band stream 208 may be a part of an EPG, an interactive program guide, or an electronic service guide (ESG). These devices allow a viewer to navigate, select, and search for content by time, channel, genre, title, and the like. A typical EPG may have a graphical user interface that enables the display of program titles and other descriptive information such as program identifiers, a summary of subject matter for programs, names of actors, names of directors, year of production, and the like.

As shown in FIG. 2, the native format digital audio stream 211 is routed to audio DAC 230 to produce an audio output signal 231. The native format digital video stream 212 is routed to an NTSC/PAL or other suitable video encoder 220, which generates digital video output signals suitable for presentation to an NTSC or PAL compliant display device. In the depicted embodiment, video encoder 220 generates a composite video output signal 221 and an S video output signal 222. An RF modulator 235 receives the audio and composite video output signals 231 and 221 respectively and generates an RF output signal 233 suitable for providing to an analog input of a display (e.g., display 124 from FIG. 1). STB 121, as shown, includes universal serial bus (USB) interface 240 and a local interconnection interface 245. Local interconnection interface 245 may, in some embodiments, support Home Phone Networking Alliance (HPNA) or another form of local interconnection 123 as shown in FIG. 1.

The illustrated embodiment of STB 121 includes storage resources 270 that are accessible to controller 260 and possibly one or more multimedia modules. Storage 270 may include dynamic random access memory (DRAM) or another type of volatile storage identified as memory 275 as well as various forms of persistent or nonvolatile storage including flash memory 280 and/or other suitable types of persistent memory devices including ROMs, erasable programmable read-only memory (EPROMs), and electrical erasable programmable read-only memory (EEPROMs). In addition, the depicted embodiment of STB 121 includes a mass storage device in the form of one or more magnetic hard disks 295 supported by integrated device electronics (IDE) compliant or other type of disk drive 290. Embodiments of STB 121 employing mass storage devices may be operable to store content locally and play back stored content when desired. In addition, one or more components of storage 270 may be employed to store program identification data, user preferences, administrator preferences, and the like for operation of disclosed embodiments.

Figure 3:
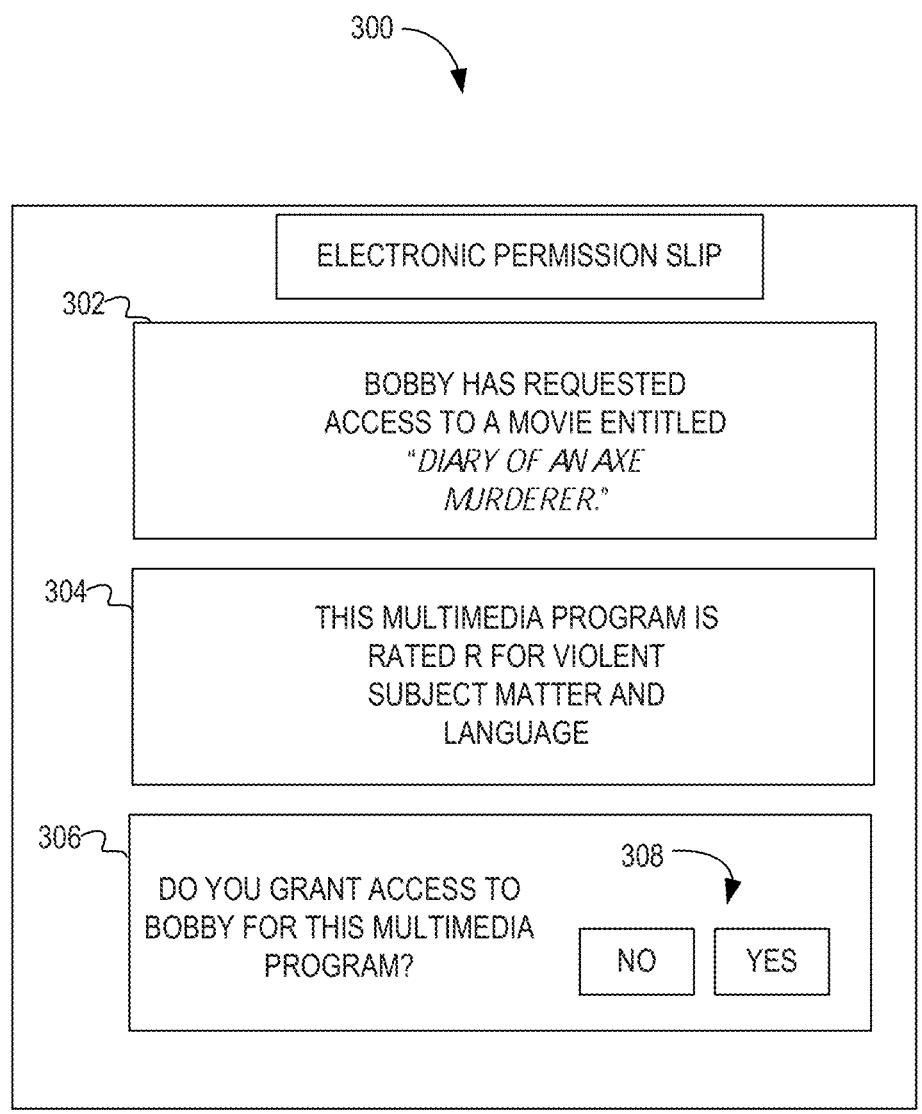
FIG. 3 depicts a "blank" electronic permission slip that, in accordance with disclosed embodiments, is presented to an administrator for input regarding permission to view a restricted multimedia program.

FIG. 3 illustrates an illustrative electronic permission slip 300 that may be used by a viewer to request, and in some cases obtain, permission to receive a restricted multimedia program (e.g., an R-rated television program) in accordance with disclosed embodiments. As shown, permission slip 300 includes a request indication 302 that informs the administrator that a viewer (e.g., "Bobby") has requested access to a restricted multimedia program (e.g., "Diary of an Axe Murderer"). In addition, electronic permission slip 300 includes a description 304 regarding the restricted multimedia program. Description 304 may be generated automatically by a disclosed embodiment or augmented by a viewer to include customized text. In addition, the viewer may be allowed to include other text (not depicted) within the permission slip that may be intended to influence the administrator's decision regarding whether to grant the request to view the restricted multimedia program. As shown, electronic permission slip 300 includes a permission indicator 306 that includes voter buttons 308 that indicate either "yes" or "no" regarding the administrator's permission. In the particular embodiment depicted in FIG. 3, voter buttons 308 may permit an administrator that, for example, receives electronic permission slip 300 within an email application running on a data processing system (e.g., a personal computer). Upon receiving permission slip 300 as shown, the administrator may highlight either of the voter buttons 308 to indicate the administrator's willingness to grant the viewer (i.e., "Bobby") access to the multimedia program. In response to the administrator choosing one of the voter buttons 308, a computer program or script (not depicted) may run to inform an STB or network-based system regarding the administrator's decision. In some embodiments, an administrator may wish to execute a "pocket veto" by not answering permission slip 300. In other cases, an administrator may be unavailable to respond to a request. In such cases, the permission slip 300 or associated components may have a "time-out" feature that denies access to the multimedia program after a certain time has elapsed without an answer from the administrator.

Figure 4:
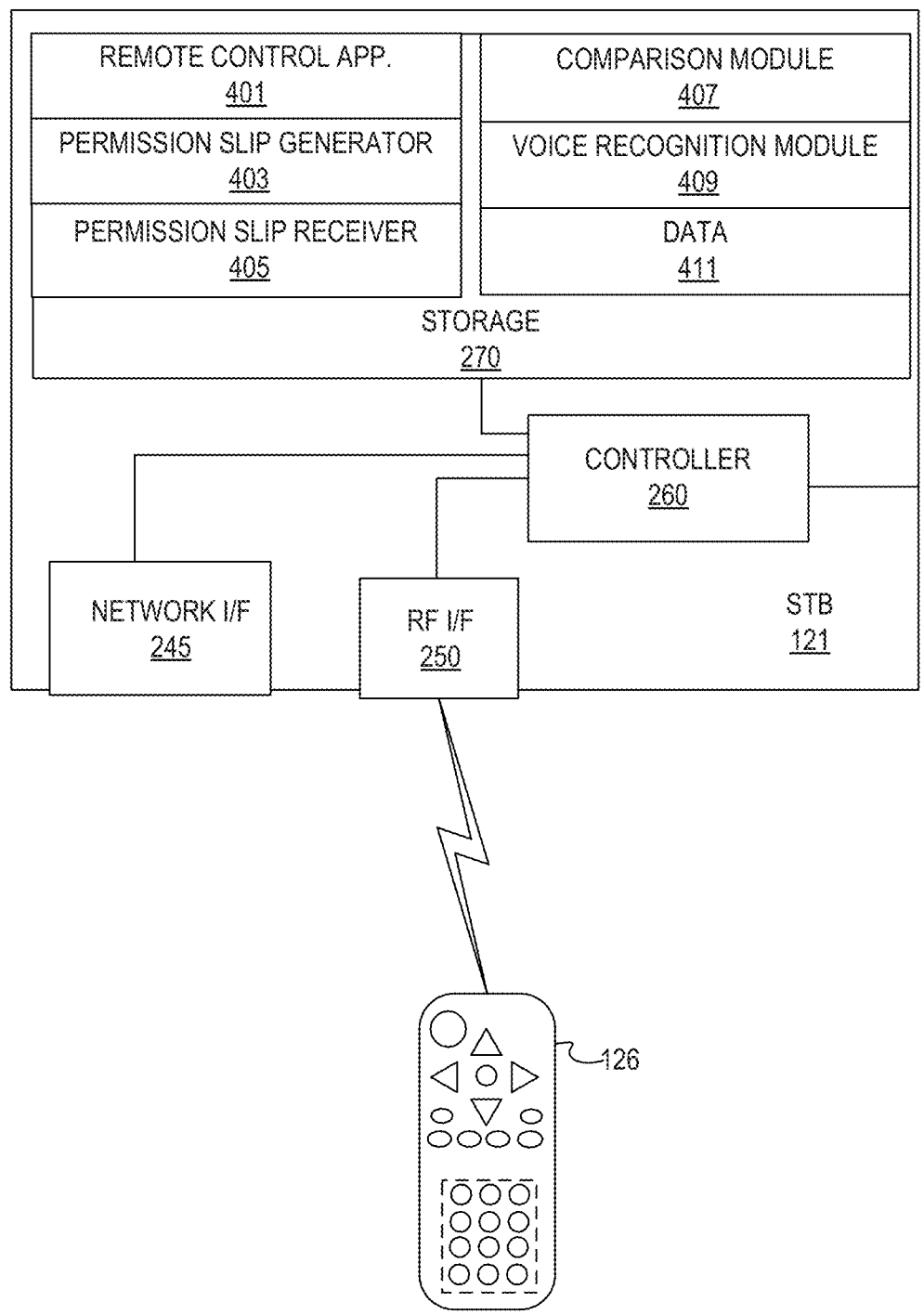
FIG. 4 depicts, in block diagram form, selected software-based applications for an administrator to control access to restricted multimedia programs in accordance with disclosed embodiments.

FIG. 4 illustrates STB 121, which has selected software elements or modules (e.g., software applications) operable for controlling access to restricted multimedia programs based on substantially real-time administrator approval, in some embodiments. In the depicted implementation, storage 270 includes programs or execution modules identified as remote control application 401, permission slip generator 403, permission slip receiver 405, comparison module 407, and voice recognition module 409. In addition, the depicted implementation of storage 270 includes data 411.

Remote control application 401 includes computer executable code that supports STB 121's remote control functionality. For example, when a viewer depresses a volume button on remote control device 126 (FIG. 1), remote control application 401 is invoked by controller 260 in response to a signal from RF I/F 250 indicating that RF I/F 250 has received a remote control command signal. Although the embodiments described herein employ a wireless remote control device 126 to convey viewer commands to STB 121, the viewer commands may be conveyed to STB 121 in other ways. For example, STB 121 may include a front panel having function buttons that are associated with various commands, some of which may coincide with commands associated with function buttons on remote control device 126. Similarly, although remote control device 126 is described herein as being an RF or IR remote control device, other embodiments may use other media and/or protocols to convey commands to STB 121. For example, remote control commands may be conveyed to STB 121 via USB (Universal Serial Bus), WiFi (IEEE 802.11-family protocols), and/or Bluetooth techniques, all of which are well known in the field of network communications. RF I/F 250 may be operable to parse or otherwise extract the remote control command that is included in the signal. The remote control command may then be made available to controller 260 and/or remote control application 401. In this manner, remote control application 401 may receive an indication of the remote control command from the RF I/F 250 directly or from controller 260. In the latter case, for example, controller 260 might call remote control application 401 as a function call and include an indication of remote control 126 as a parameter in the function call. Network interface 245, as shown in FIG. 4, may communicate with the Internet, a wide-area network, a service provider access network, or some combination of networks to send and receive messages (e.g., permission slips) between STB 121 and an administrator's communication devices, media or accounts.

Permission slip generator 403, in some embodiments, formats or generates a permission slip that includes an indication of a viewer's request to view a multimedia program. In operation, a viewer may manipulate an electronic programming guide, for example, to select a multimedia program that has a rating that causes it to be restricted by STB 121. In response, the permission slip generator 403 or another similar software module may prompt the viewer for input regarding whether the viewer wishes to seek approval from an administrator (e.g., a parent) to view the multimedia program. In response to a viewer answering affirmatively that the viewer wishes to seek administrator approval, the viewer may then be prompted to select one or more administrators for sending a "blank" permission slip. In some embodiments, a viewer is allowed to add textual or voice input with a "blank" permission slip for presentation to the administrator. For example, a viewer may add the text, "I finished my homework" or other similar text to indicate to the administrator that a prior condition has been met that may influence whether the administrator grants permission. In some embodiments, more than one administrator is associated with a service provider account and allowed to control viewer access to restricted multimedia programs. In such cases involving multiple administrators, the viewer may choose which administrator or administrators receive generated permission slips.

As shown in FIG. 4, permission slip receiver 405 is for processing messages sent or returned by an administrator and intended to either grant or deny the viewer access to the restricted multimedia program. In some cases, permission slip receiver 405 processes a return SMS text message, an e-mail, or an audio file sent by the administrator. In some cases, permission slip receiver 405 may operate in conjunction with voice recognition module 409 to process received audio files that may contain permission indications from an administrator. In addition, permission slip receiver 405 may operate in conjunction with comparison module 407 to compare processed words with known words related to permissions. For example, words such as "absolutely," "yes," "why not," and "sure" may be associated with an administrator granting a viewer permission to receive a restricted multimedia program. Similarly, words and phrases such as "no," "nope," and "absolutely not" may be stored and associated with a denial of permission. Stored words may reside as part of data 411. In operation, comparison module 407 may compare known words to received words to help determine whether an administrator intends to grant or deny a viewer's request to receive and view a restricted multimedia program.

Figure 5:
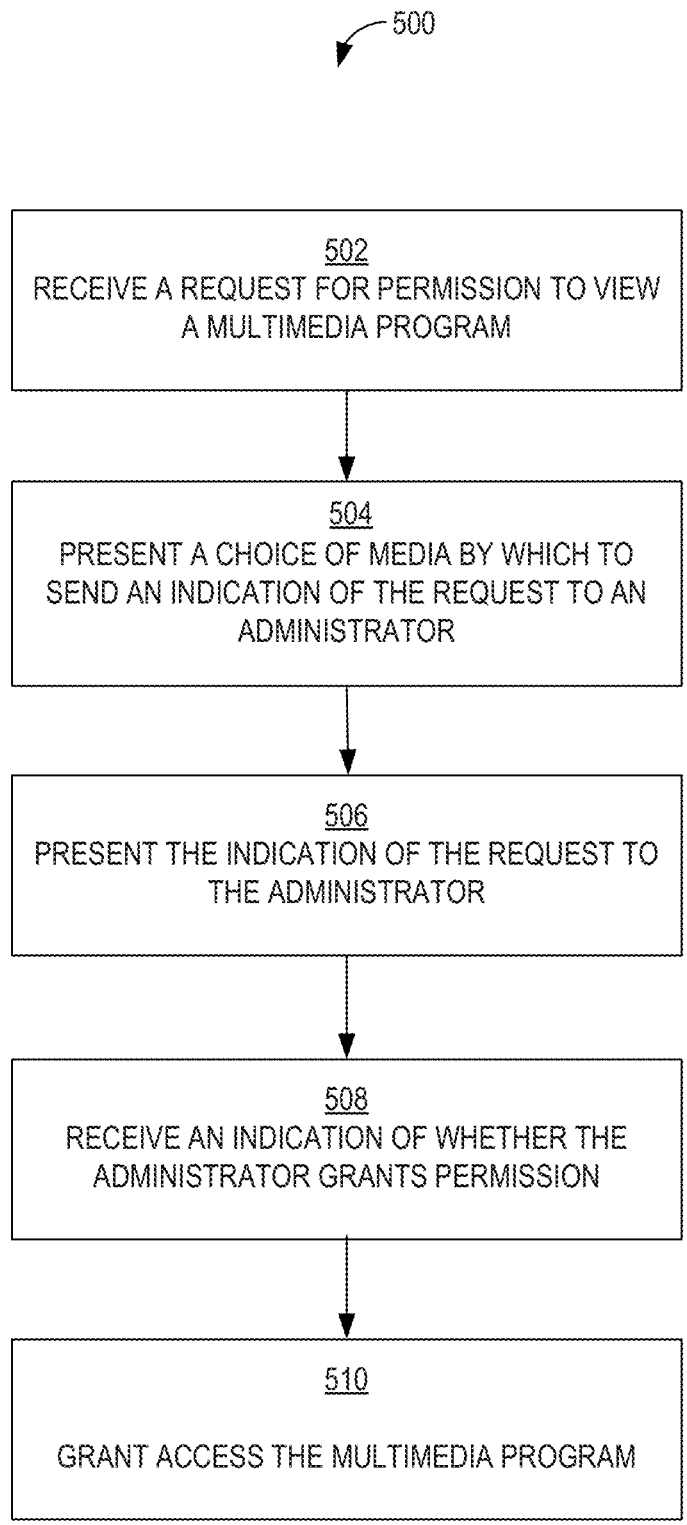
FIG. 5 is a flow diagram with selected operations for an administrator to control access to restricted multimedia programs in accordance with disclosed embodiments.

Referring now to FIG. 5, methodology 500 includes operations 502-510 for controlling access to multimedia programs in accordance with disclosed embodiments. As shown, operation 502 relates to receiving a request for permission to view a multimedia program. In some embodiments, a child may initiate a request for permission to view a restricted multimedia program using a remote control device (e.g., remote control device 126-2 in FIG. 1) in conjunction with a graphical user interface presented on a display (e.g., display 124-2). The request for permission to view the multimedia program may be in response to the child requesting to view a restricted multimedia program and a set-top box (e.g., STB 121-2) or a network-based application denying access to the multimedia program. As shown in FIG. 5, optional operation 504 relates to presenting a choice of media (i.e., communication method) by which to send the indication of the request to an administrator. For example, in an embodiment, STB 121-2 (FIG. 1) presents to a viewer of display 124-2 (FIG. 1) a list containing an e-mail address, a mobile telephone number, a work telephone number, and possibly other communications methods and devices associated with the administrator. If there are multiple administrators, for example two parents, the numbers, accounts, or devices of both administrators may be presented to the viewer requesting permission. If the viewer happens to know where the administrator may be reached, the viewer may select an appropriate medium or device by which to contact the administrator. In some embodiments, presence information may be used to automatically or manually select which of several communication devices to use when commuting with the administrator. For example, a viewer may be presented with an icon indicating that the administrator is currently logged into a particular Internet account. In such cases, the viewer may choose the Internet account as the medium by which to contact the administrator with the request. In some cases, the presence information is automatically used by disclosed embodiments to contact the administrator. In some cases, multiple media or communications devices are used simultaneously or in series until a response from the administrator is received or a timeout is reached.

As shown in FIG. 5, operation 506 relates to presenting the indication of the request to the administrator. In an embodiment, an administrator is presented with a blank graphical electronic permission slip (e.g., permission slip 300 in FIG. 3) that is or contains an indication of the request. In some embodiments, an audible indication request is presented to the administrator. For example, and audible indication of the request may be presented to the administrator using synthesized speech sent to the administrator's telephone. As a further example, synthesized speech may be sent as a voice note to an e-mail address associated with the administrator. In addition to using synthesized speech to present the administrator with an indication of the request, a text-based SMS compatible message or an email message may be sent. The examples provided herein regarding the indication of the request are provided as illustrations only and are not meant to restrict or limit the types of indications that may be sent to administrators to inform the administrator of the requests.

In operation 508, an indication of whether the administrator grants permission is received. In some embodiments, the administrator may provide audible input (i.e., spoken words) that are processed by a speech recognition module to determine whether the administrator intends to grant the viewer permission to view the restricted multimedia program. For example, a voice-recognition module may listen for the words "permission granted" as an indication that the viewer is allowed by the administrator to view the restricted multimedia program. In some embodiments, an administrator may select one or more "vote buttons" (e.g., voter buttons 308 in FIG. 3) presented in an e-mail or graphical environment. Such voter buttons may be used by the administrator to indicate whether the viewer has the administrator's permission to access to the restricted multimedia content. In other cases, an administrator may use a telephone or similar electronic device to generate tone inputs, for example, for selecting whether the permit or deny access to the restricted multimedia program. In some cases, an administrator is presented with an opportunity to provide security credentials (e.g., login credentials) to ensure that the administrator is entitled to grant permission, for example, through service provider account. In operation 510, access is granted to the multimedia program if the administrator provides approval. In some cases (not shown), the administrator denies permission for a viewer to access restricted content and operation 510 is not performed.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims. For example, although disclosed embodiments may be described in terms of STBs, it should be noted that disclosed embodiments may incorporate such functionality into data processing systems, displays, televisions, or monitors that do not have physical characteristics, for example, of traditional converter boxes that may have been operated from atop a television, as the name "set-top box" may otherwise suggest.

What is claimed is:

1. A method, comprising:
    receiving a request from a user to access a multimedia program, wherein the multimedia program includes digital television content that is blocked from access by the user;
    in response to receiving the request from the user, generating a user interface that enables the user to choose a media item for inclusion with an electronic permission slip;
    sending, via a mode of communication selected by the user, an electronic permission slip to an administrator device associated with an administrator, wherein the electronic permission slip includes:
        the media item;
        identification of the multimedia program; and
        a textual description of the multimedia program;
    wherein the electronic permission slip prompts the administrator for approval data indicative of whether the administrators grants permission for the user to access the multimedia program;
    receiving audio input from the administrator device;
    performing voice recognition on the audio input;
    based on the voice recognition, identifying words in the audio input; and
    interpreting the words to determine whether the administrator grants the authorization.

2. The method of claim 1, wherein the electronic permission slip includes a voice message.

3. The method of claim 2, wherein sending the electronic permission slip includes sending a short message service communication.

4. The method of claim 3, further comprising:
    selecting, based on user input, the administrator device from a plurality of available administrator devices.

5. The method of claim 1, further comprising:
    accessing presence information associated with an administrator;

determining, from the presence information, the administrator device from a plurality of available administrator devices.

6. The method of claim 1, further comprising:
receiving a tone input generated by a telephone of the administrator, wherein the tone input indicates whether the administrator granted the user access approval.

7. The method of claim 1, wherein the electronic permission slip includes a graphical user interface with voting buttons.

8. The method of claim 1, wherein sending the electronic permission slip to the administrator device includes sending an email further comprising:
receiving, from the administrator, security credentials; and
determining whether the administrator is authorized to grant user access approval.

9. The method of claim 1, further comprising:
sending the electronic permission slip to an Internet-based account of the administrator.

10. A non-transitory computer readable medium including processor executable instructions, which when executed by a processor, cause the processor to perform operations comprising:
receiving a request from a user to access a multimedia program, wherein the multimedia program includes digital television content that is blocked from access by the user;
in response to receiving the request from the user, generating a user interface that enables the user to choose an audio media item for inclusion with an electronic permission slip; and
sending, via a mode of communication selected by the user, an electronic permission slip to an administrator device associated with an administrator, wherein the electronic permission slip includes:
the media item;
identification of the multimedia program; and
a textual description of the multimedia program;
wherein the electronic permission slip prompts the administrator for approval data indicative of whether the administrators grants permission for the user to access the multimedia program;
receiving audio input from the administrator device;
performing voice recognition on the audio input;
based on the voice recognition, identifying words in the audio input; and
interpreting the words to determine whether the administrator grants the authorization.

11. The non-transitory computer readable medium of claim 10, wherein the operations include:
communicating a denial of the authorization to the user when the administrator denies the authorization.

12. The non-transitory computer readable medium of claim 10, wherein sending the permission slip includes sending a short message service text communication.

13. The non-transitory computer readable medium of claim 10, wherein sending the permission slip includes sending an email to an email address of the administrator.

14. The non-transitory computer readable medium of claim 10, wherein the electronic permission slip includes synthesized speech identifying the multimedia program.

15. A system for processing electronic permission slips, the system comprising:
a processor;
a non-transitory computer readable storage medium, accessible to the processor, including processor executable instructions, which when executed by the processor, cause the processor to perform operations comprising:
receiving a request from a user to access a multimedia program, wherein the multimedia program includes digital television content that is blocked from access by the user;
in response to receiving the request from the user, generating a user interface that enables the user to choose a media item for inclusion with an electronic permission slip;
sending, via a mode of communication selected by the user, an electronic permission slip to an administrator device associated with an administrator, wherein the electronic permission slip includes:
the media item;
identification of the multimedia program; and
a textual description of the multimedia program;
wherein the electronic permission slip prompts the administrator for approval data indicative of whether the administrators grants permission for the user to access the multimedia program
receiving audio input from the administrator device;
performing voice recognition on the audio input;
based on the voice recognition, identifying words in the audio input; and
interpreting the words to determine whether the administrator grants the authorization.

16. The system of claim 15, wherein the permission slip is sent to the administrator in email format.

17. The system of claim 15, wherein the permission slip is sent to the administrator in short message system format.

18. The system of claim 15, wherein the permission data includes text content.

* * * * *